(12) United States Patent
Carter et al.

(10) Patent No.: US 10,485,188 B2
(45) Date of Patent: Nov. 26, 2019

(54) TRELLIS POST

(71) Applicant: NZ TUBE MILLS LIMITED, Lower Hutt (NZ)

(72) Inventors: Terry Scott Carter, Lower Hutt (NZ); Paul Barnes, Lower Hutt (NZ)

(73) Assignee: NZ Tube Mills Limited, Lower Hutt (NZ)

( * ) Notice: Subject to any disclaimer, the term of this patent is extended or adjusted under 35 U.S.C. 154(b) by 773 days.

(21) Appl. No.: 14/700,530

(22) Filed: Apr. 30, 2015

(65) Prior Publication Data

US 2016/0319566 A1 Nov. 3, 2016

(51) Int. Cl.
*A01G 17/14* (2006.01)
*E04H 17/12* (2006.01)

(52) U.S. Cl.
CPC ............. *A01G 17/14* (2013.01); *E04H 17/12* (2013.01)

(58) Field of Classification Search
CPC ..... E04H 17/10; E04H 17/12; E04H 17/2024; A01G 17/14; H01B 17/14; H01B 17/16; H01B 17/20; H01B 17/22; H01B 17/145; A01K 3/005; E01F 15/06; F16L 27/12; F16L 27/113; F16L 27/1136; A44B 99/005; A45F 5/02
USPC ..... 256/13.1, 21, 22, 32, 34, 44, 47, 53, 58, 256/DIG. 3, DIG. 5; D25/119, 132; 404/6, 9; 285/233; 138/106, DIG. 11; 24/3.1, 663; 224/197

See application file for complete search history.

(56) References Cited

U.S. PATENT DOCUMENTS

| | | | | |
|---|---|---|---|---|
| 320,330 A | * | 6/1885 | Brown | E02D 5/80 256/55 |
| 547,896 A | * | 10/1895 | Smith | F16G 11/00 24/129 R |
| 948,607 A | * | 2/1910 | Gage | E04H 17/12 256/56 |
| 1,142,406 A | * | 6/1915 | Dillion | E04H 17/12 256/58 |
| 1,178,630 A | * | 4/1916 | Cothran | E04H 17/003 256/55 |
| 1,280,093 A | * | 9/1918 | Sholund | E04H 17/12 256/58 |
| 1,315,220 A | * | 9/1919 | Evans | E04H 17/12 256/58 |
| 2,025,014 A | * | 12/1935 | Brickman | E01F 15/0438 256/13.1 |
| 2,152,018 A | * | 3/1939 | Barnhart | A01G 9/12 248/27.8 |

(Continued)

FOREIGN PATENT DOCUMENTS

| | | | | |
|---|---|---|---|---|
| AU | 2004203557 A1 | * | 2/2005 | ........... A44B 99/005 |
| EP | 0559352 A1 | * | 9/1993 | ........... A44B 99/005 |
| FR | 2853205 A3 | * | 10/2004 | ............. E04H 17/10 |

*Primary Examiner* — Jonathan P Masinick
(74) *Attorney, Agent, or Firm* — Inventa Capital PLC (57) ABSTRACT

A post includes a hollow elongate tubular pipe. The post has an open upper end and an open lower end. The post has an upper portion and a lower ground engaging portion joined to one another. The upper portion is adapted to predominately extend above the ground and the lower ground engaging portion is adapted to be fully inserted into the ground. The upper portion and the lower ground engaging portion are separated by a protruding region immediately adjacent to where the upper portion and lower ground engaging portion join together.

30 Claims, 5 Drawing Sheets

(56) References Cited

U.S. PATENT DOCUMENTS

| | | | | |
|---|---|---|---|---|
| 2,477,607 A * | 8/1949 | Hungate | F16B 21/02 | 29/558 |
| 2,502,867 A * | 4/1950 | Mantelet | A47J 43/255 | 241/273.3 |
| 2,955,150 A * | 10/1960 | Wilson | H01B 17/145 | 174/159 |
| 3,688,439 A * | 9/1972 | Doxsee | E01F 13/085 | 49/131 |
| 3,820,758 A * | 6/1974 | Berg, Jr. et al. | A01K 3/005 | 174/163 F |
| 4,077,611 A * | 3/1978 | Wilson | A01K 3/005 | 174/163 F |
| 4,241,916 A * | 12/1980 | Palm | A63B 63/083 | 24/115 K |
| 4,363,625 A * | 12/1982 | der Avanessian | A61C 9/002 | 433/74 |
| 4,771,137 A * | 9/1988 | Thompson | H01B 17/145 | 174/163 F |
| 5,604,958 A * | 2/1997 | Anscher | A45C 7/0086 | 224/197 |
| 5,640,802 A * | 6/1997 | Elliott | A01G 9/12 | 248/156 |
| 5,797,214 A * | 8/1998 | Parrish | A01G 17/06 | 47/46 |
| 5,959,255 A * | 9/1999 | Langlie | H01B 17/145 | 174/161 F |
| 6,561,931 B1 * | 5/2003 | Reeves | A63B 63/004 | 403/102 |
| 6,575,656 B2 * | 6/2003 | Suh | E04H 15/46 | 135/114 |
| 6,854,916 B2 * | 2/2005 | Hsieh | F16B 7/105 | 403/109.1 |
| D511,219 S * | 11/2005 | Cleary | A01K 3/005 | D25/119 |
| 7,191,996 B2 * | 3/2007 | Patsalaridis | E04H 12/2223 | 135/16 |
| 7,401,996 B2 * | 7/2008 | Neusch | E01F 15/06 | 256/13.1 |
| D636,661 S * | 4/2011 | Marmas | D8/395 | |
| 8,132,649 B2 * | 3/2012 | Rogers | E04G 7/20 | 182/178.6 |
| D669,437 S * | 10/2012 | Wilson, Jr. | A01G 9/12 | D13/129 |
| 8,377,397 B2 * | 2/2013 | Ford | F27B 17/02 | 422/549 |
| 8,672,577 B2 * | 3/2014 | Wojtowicz | A47B 87/0215 | 211/191 |
| 8,858,112 B2 * | 10/2014 | Wallace | E01F 15/0423 | 256/13.1 |
| 2001/0040235 A1 * | 11/2001 | Dwyer | E04H 17/10 | 256/47 |
| 2003/0181264 A1 * | 9/2003 | Yoon | A63B 71/023 | 473/421 |
| 2007/0003361 A1 * | 1/2007 | Wang | F16B 7/105 | 403/109.3 |
| 2011/0233497 A1 * | 9/2011 | Forge | E04H 17/10 | 256/47 |
| 2017/0321449 A1 * | 11/2017 | Flight | A01K 3/005 | |
| 2017/0342739 A1 * | 11/2017 | Larson | E04H 17/10 | |

* cited by examiner

FIG. 8

TRELLIS POST

FIELD OF INVENTION

The invention relates to a post, typically a trellis post for use, but not limited thereto, as part of a vine trellis system.

BACKGROUND OF THE INVENTION

Post and post clips for attaching and holding wire to the posts are varied and widely used in all areas of agriculture and horticulture sectors either to fence in livestock or as trellises for holding vines. However a post once inserted into the ground may pull out of or push into the ground when tensioned from above, below or combination of both. Some posts are treated with poisonous substances which are difficult to dispose of and may leach into the host materials. Posts may break when machinery makes accidental contact due to flexibility and strength issues of alternative wooden post. In some applications, clips are attached to the post to assist in holding wire or the like, however the attaching of clips usually involves staples, nails or screws which can be time consuming and can be executed incorrectly. Replacing and repairing clips is also a time consuming process. It is known for the insertion of a second device or post adjacent to the post base or a welded section on the base of the post to assist in restraining angular or vertical movement of the post when in the ground. This can be done at time of being placed in the ground or done as retrofit once vertical movement of the post occurs.

However this is an expensive and time consuming exercise. Known posts can also bend as a result of the tension being applied and or can snap and break, thus placing the whole integrity of the fence or trellis at risk. Current posts can be difficult to place in the ground, especially when it comes to driving posts into the ground. It is an object of the invention to provide a trellis post that ameliorates some of the disadvantages and limitations of the known art or at least provide the public with a useful choice.

SUMMARY OF THE INVENTION

In a first aspect the invention resides in a post having an elongate tubular hollow member with an open upper end and an open lower end, wherein the elongate member includes: an upper portion and a lower ground engaging portion joined to one another so that the upper portion is adapted to predominately extend above the ground and the lower ground engaging portion is adapted to be fully inserted into the ground; the upper portion at the upper end of the elongate tubular hollow portion has a rolled round end edge so as to form a softened and/or smooth top edge to the post in order to lessen and/or prevent snagging or catching of the post with netting, mesh, wires, scrimp, frost or hail protectors or the like; the lower ground engaging portion has a protruding region immediately adjacent to where the upper portion and lower ground engaging portion join together, the diameter of the protruding region is greater than the diameter of the upper portion such that the protruding region defines a lipped section that is perpendicular to the longitudinal axis of the post, the lipped section is adapted to prevent the post from moving vertically when the ground engaging portion of the post is fully inserted into and enclosed within the ground; a plurality of spaced apart slotted apertures for supporting elongate strand members and wire retaining clips; and at least one removeable wire retaining clip for retaining an elongate strand member to the post, the wire retaining clip is retained within the slotted aperture, the wire retaining clip includes: a main body portion having a base adapted to contour and abut with the post, a central portion extending upwardly from the base and at least two wire engaging portions projecting outwardly from and transverse to the vertical axis of the central portion, each wire engaging portion projects outwardly in an opposite direction relative to other wire engaging portions, each wire engaging portion has an end part that curves inwardly towards the base and the central portion so as to define a wire engaging aperture that is adapted to capturing, retaining and supporting a part of elongate strand member therein; and an aperture engaging means extending outwardly and downwardly from the base of the main body portion wherein the aperture engaging means is dimensioned and configured to fit within the slotted aperture in the post and to retain the wire retaining clip to the post.

Preferably, the diameter of the upper portion is greater than the diameter of the distal end of the ground engaging portion.

Preferably, the lipped section forms an edge between the upper portion and lower ground engaging portion.

Preferably, the edge slopes from the ground engaging portion toward the upper portion.

Preferably, the diameter of the lipped section is greater than the diameter of the upper region to the extent to prevent the post from moving vertically once the post is inserted in to the ground.

Preferably, the upper and lower ground engaging portions are integrally joined.

Preferably, the upper and lower ground engaging portions consist of a plurality modular sections removably joined together such that the height of the post can be varied when a longer or shorter post is required.

Preferably, the length of the upper modular sections are between 0.5 m and 3 m length.

Preferably, the lipped section is formed by swaging the lower ground engaging portion until the diameter of the lower ground engaging portion in the area immediately adjacent the upper portion is greater than the diameter of the upper portion.

Preferably, the post is made from a suitable rigid and durable material for supporting wire and/or vine trellis.

Preferably, the post is made from galvanized steel.

Preferably, the post is made from metal, plastic, fiber glass, or any combination or composite thereof.

Preferably, the slotted apertures extend and are spaced along the length of the upper portion.

Preferably, the slotted apertures extend and are equally spaced circumferentially around the upper portion.

Preferably, the lower ground engaging portion has a least one aperture to allow a footer to be attached to the post.

Preferably, the apertures in the lower portion are elongate.

Preferably, the apertures are slots.

Preferably, the post has a plurality of removeable wire retaining clips where each wire retaining clip is retained within a respective slotted aperture.

Preferably, the wire engaging apertures of the wire retaining clip are equally spaced apart from the central portion.

Preferably, the base of the wire retaining clip has an outwardly facing portion that is contoured such that when the wire retaining clip is attached to a post the base contours and abuts evenly against the post.

Preferably, the aperture engaging means has a shaft attached at one end to the base and has a locking member attached at its other end such that the locking member is spaced a distance from the base.

Preferably, the shaft has a diameter slightly less than the diameter of the aperture in the post.

Preferably, the shaft has a length just slightly greater than the wall thickness of the post so as to allow the wire retaining clip to be rotated and to abut and attach to the post when the wire retaining clip is in a slotted aperture.

Preferably, the length of the main body portion in its horizontal extent is greater than the length of the main body portion in its vertical extent.

Preferably, the locking member has a portion with a width greater than the posts aperture diameter of greatest extent, the locking member has another portion having a width that is less than the slotted aperture's diameter of greatest extent such that when in one orientation the locking member is able to be inserted into the slotted aperture and in another orientation where the wire retaining clip is rotated 90° the locking member is not able to be removed from the slotted aperture, thus locking the wire retaining clip to the post.

Preferably, the portion of the locking member having the width of least extent extends in a direction parallel to the longitudinal axis of the main body portion of the wire retaining clip.

Preferably, the portion of the locking member having the width of greatest extent extends in a direction perpendicular to the longitudinal axis of the main body portion of the wire retaining clip.

Preferably, the locking member is elongate where the longitudinal axis of the locking member is perpendicular to the longitudinal axis of the main body portion of the wire retaining clip.

Preferably, the wire retaining clip is made from any lightweight, durable material.

Preferably, the wire retaining clip is made from plastic or nylon.

Preferably, the plastic is a polyamide resin with a carbon black stabiliser.

Preferably, the wire retaining clip is injection molded.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

The following description will describe the invention in relation to preferred embodiments of the invention, namely a trellis post. The invention is in no way limited to these preferred embodiments as they are purely to exemplify the invention only and that possible variations and modifications would be readily apparent without departing from the scope of the invention.

Figure 1:
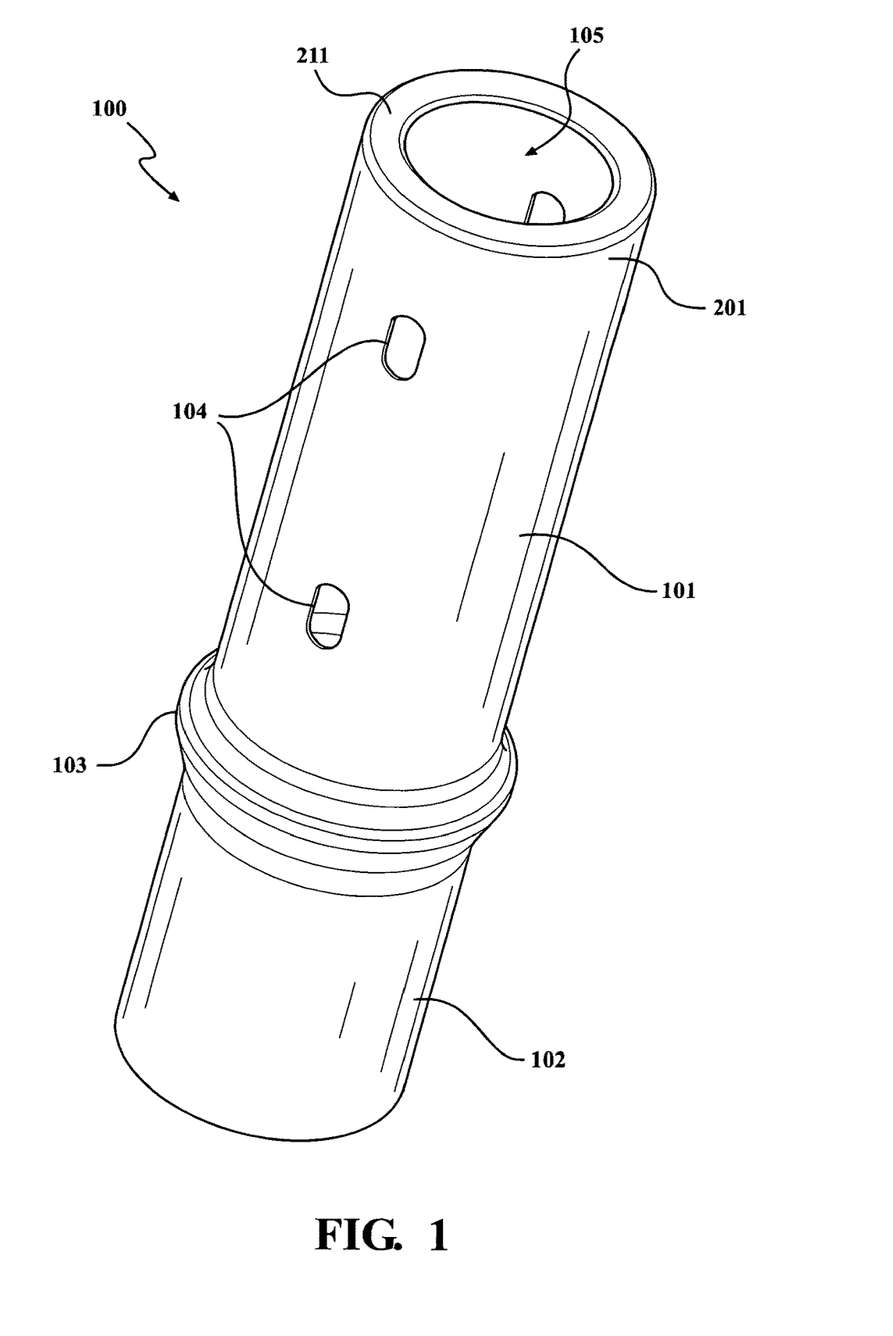
FIG. 1 is a perspective view of a post in accordance with a preferred embodiment of the invention.
Figure 2:
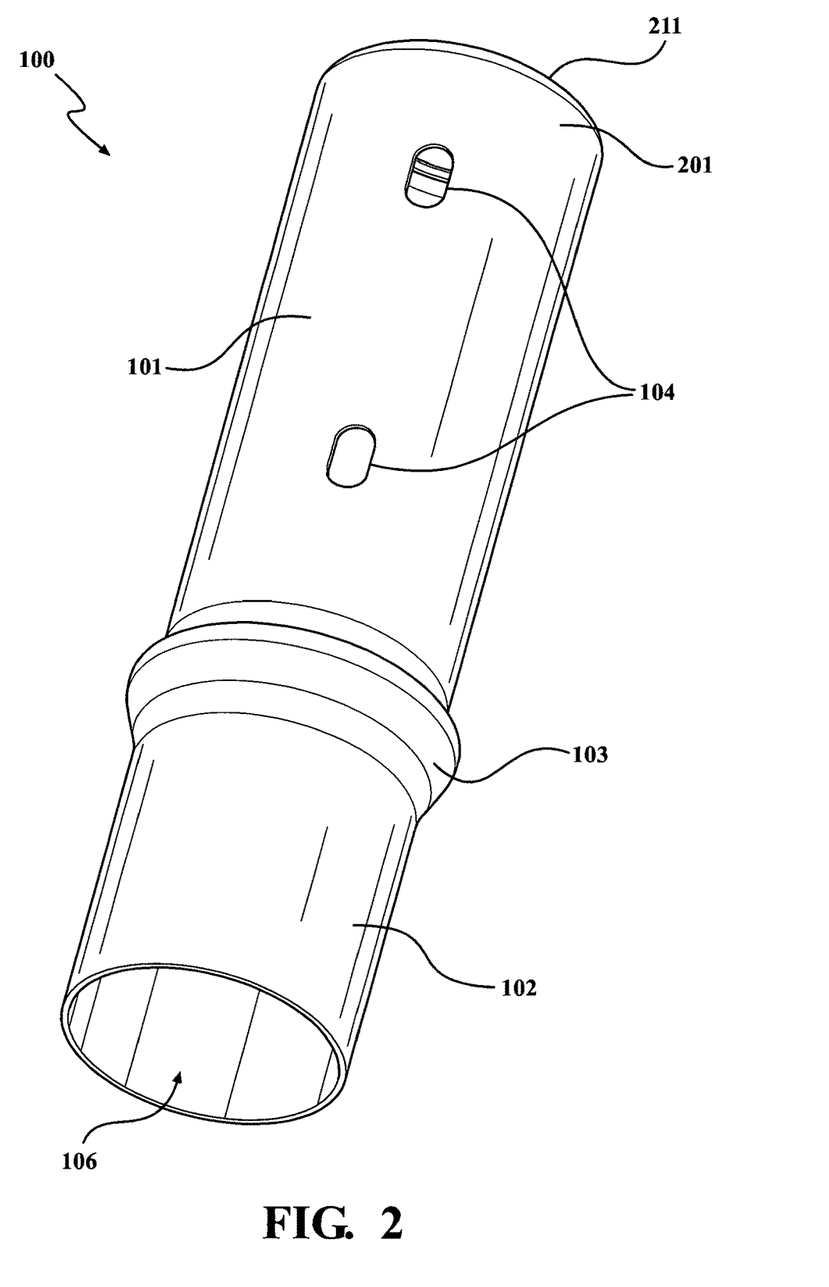
FIG. 2 is a further perspective view of the post shown in FIG. 1.
Figure 3:
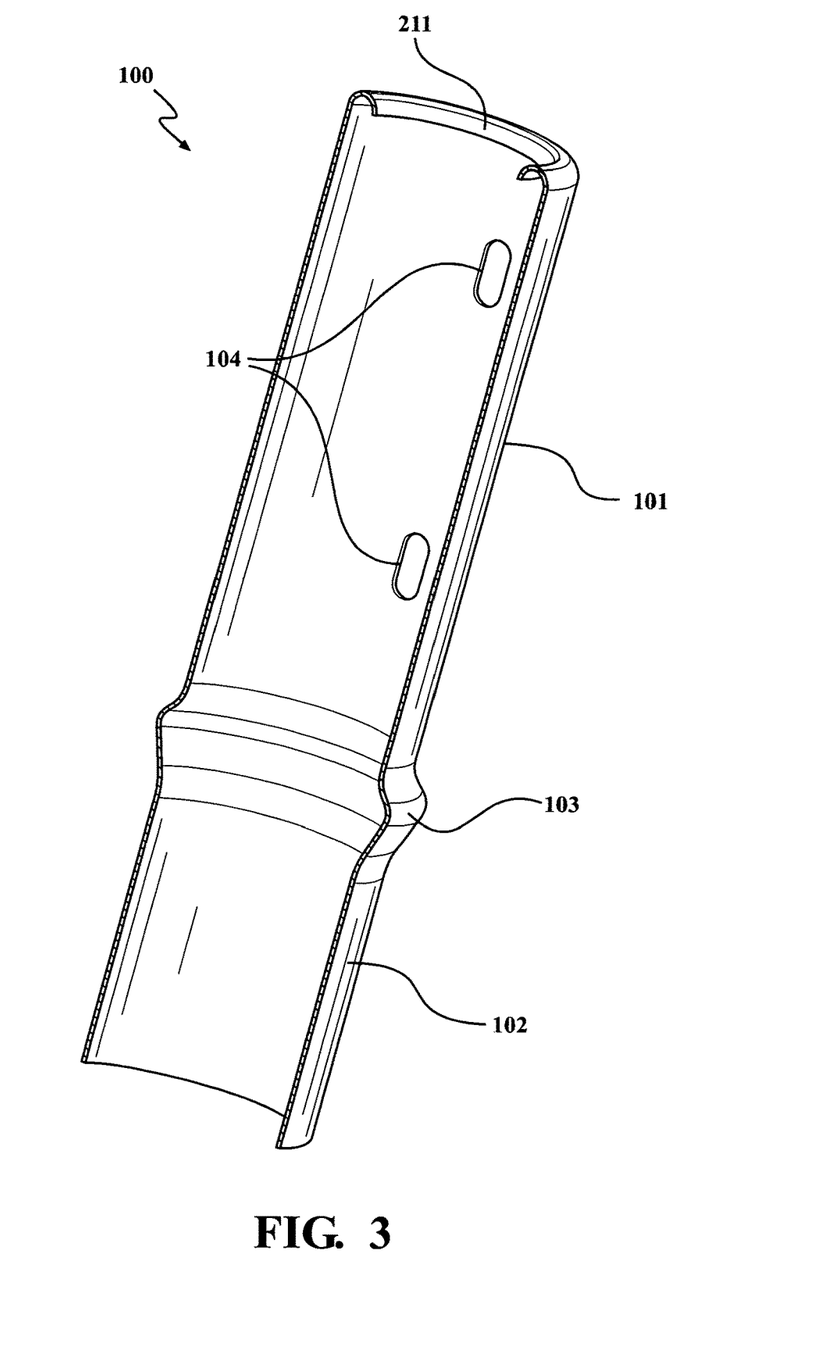
FIG. 3 is perspective cutaway view of a post shown in FIG. 1.
Figure 4:
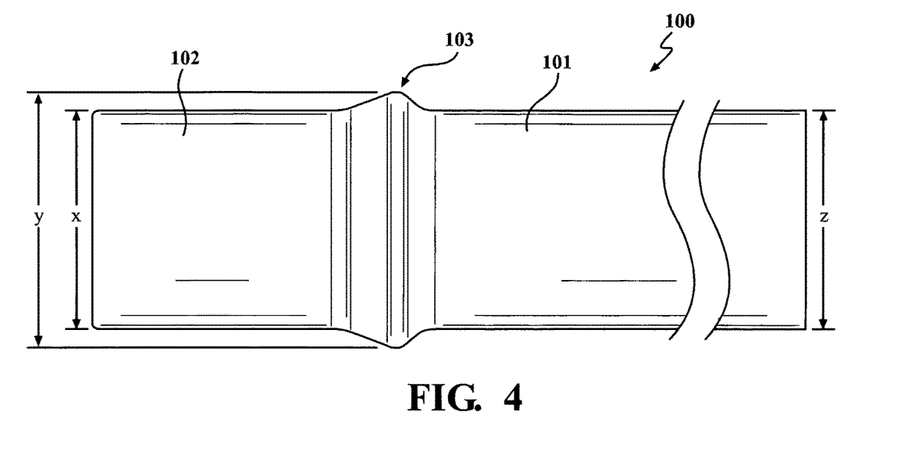
FIG. 4 is a side view of the post shown in FIG. 1.
Figure 5:
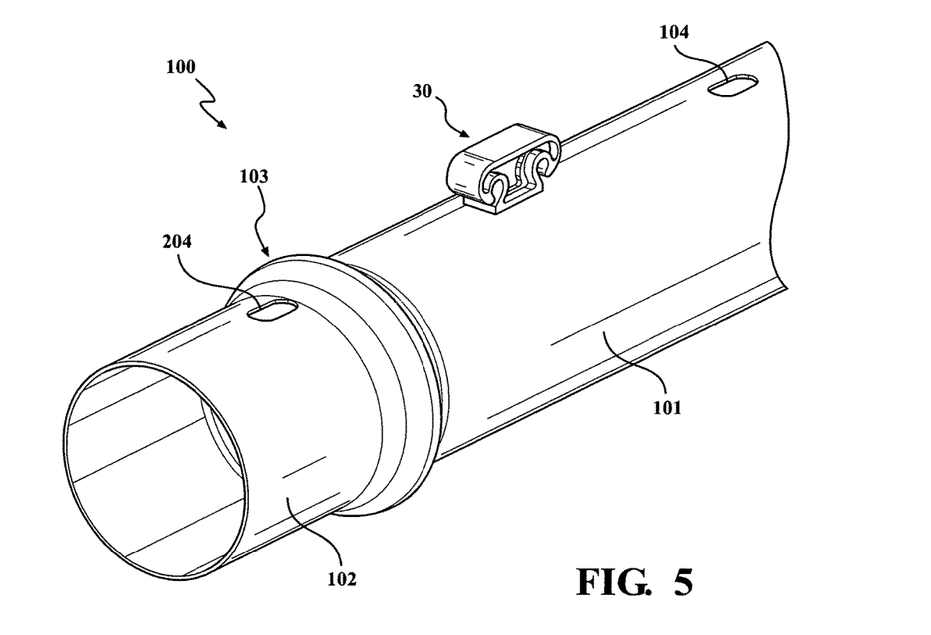
FIG. 5 is another perspective view of the post clip in the post as shown in FIG. 1.
Figure 6:
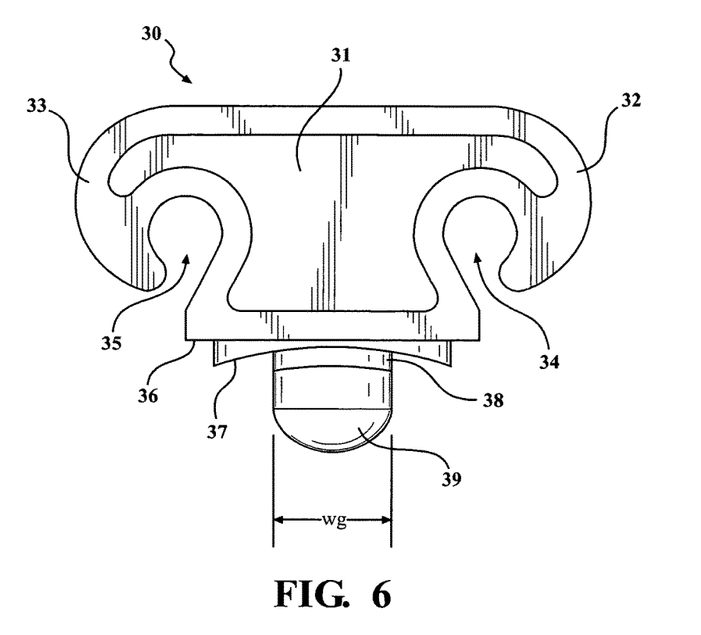
FIG. 6 is a front side view of the post clip as shown in FIG. 5.
Figure 7:
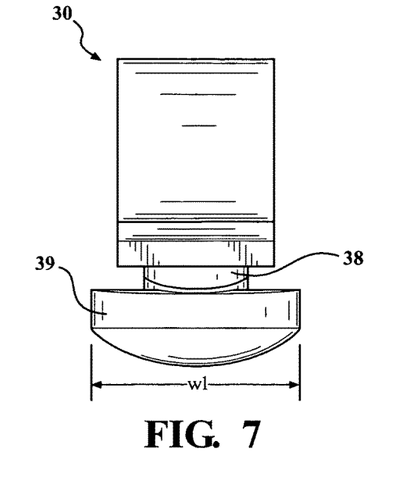
FIG. 7 is an end side view of the post clip as shown in FIG. 6.
Figure 8:
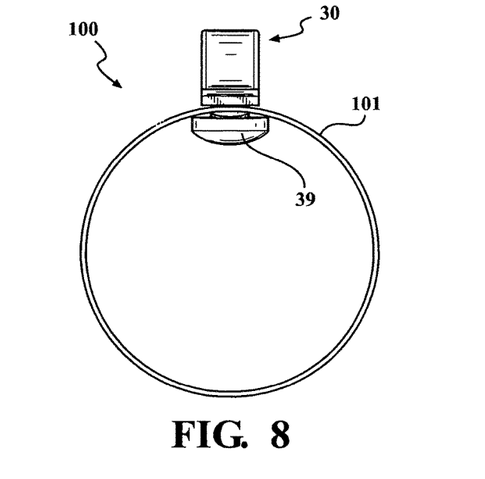
FIG. 8 is a cut away view of the post as shown in FIG. 5.

FIGS. 1 to 8 show a most preferred embodiment of the invention of a post 100 consisting of a hollow elongate tubular pipe. The post 100 has an open upper end 105 and an open lower end 106. The post 100 has an upper portion 101 and a lower ground engaging portion 102 joined to one another. The upper portion 101 is adapted to predominately extend above the ground and the lower ground engaging portion 102 is adapted to be fully inserted into the ground. The upper portion 101 and the lower ground engaging portion 102 are separated by a protruding region 103 immediately adjacent to where the upper portion 111 and lower ground engaging portion 112 join together.

The diameter Y of the protruding region 103 is greater than the diameter Z of the upper portion 101 such that the protruding region 103 defines a lipped section that is perpendicular to the longitudinal axis of the post 100. The lipped section 103 is adapted to prevent the post from moving vertically when the lower ground engaging portion 102 of the post 100 is fully inserted into and enclosed within the ground. The diameter Z of the upper portion 101 is greater than or equal to the diameter X of the distal end of the ground engaging portion 102, preferably equal to. The lipped section 103 forms an edge between the upper portion 101 and lower ground engaging portion 102 where the edge slopes from the ground engaging portion 102 toward the upper portion 101.

The diameter Y of the lipped section 103 is greater than the diameter Z of the upper portion 101 to the extent to prevent the post 100 from moving vertically once the post is inserted in to the ground. The lipped section 103 can be formed by swaging the lower ground engaging portion 102 until the diameter Y of the lower ground engaging portion 102 in the area immediately adjacent the upper portion 101 is greater than the diameter Z of the upper portion 101. The upper and lower ground engaging portions 101, 102 can be integrally joined such that the post is one piece as shown in the drawings. However is envisaged that post could be consist of a number of modular portions that are connectable together so that length of the post can be adjusted (increased or decreased) to suit a particular and desired use, for example in the first instance the post could consist of two modular parts, a lower ground engaging portion and a first upper portion to support and train a newly planted vine. Once the vine has grown and established on the first upper portion a second upper portion can be added to the first upper portion thus increasing the height of the trellis post. It is envisaged that each modular portion would have length between 0.5 m to 1 m. The post 100 is made from a suitable rigid and durable material for supporting wire and/or vine trellis.

Preferably, the post 100 is made steel, typically galvanized steel, however it is envisaged that the post 100 can made from metal, plastic, wood, fibre glass, or any suitable combination or composite thereof. As is shown in the drawings the post has a plurality of spaced apart apertures 104 for supporting wire retaining clips 30 or wires, cables or the like. The apertures 104 extend and are evenly spaced along the length of the post 100. Also the apertures 104 can extend and be equally spaced circumferentially around the post 100. Preferably, the apertures 104 are elongate and/or slot like.

The lower ground engaging portion 102 has a least one aperture 204 such that this aperture can accommodate attachment means for attaching to a footer to the post 100. The top portion 201 of the upper portion 101 of the post 100 has a rolled portion 211 surrounding the opening 105 of the hollow post 100. The rolled portion 211 forms the top portion 201 the post 100 with a softened and/or smooth top edge which therefore prevents the top portion 201 of the post 100 snagging or getting caught with netting, mesh, wires, scrimp, frost or hail protectors or the like. The ground engaging portion 102 is shown as being a straight tube shape, however it is envisaged that the ground engaging portion 102 could be tapered towards its distal end in order to enhance entry of the post 100 into the ground.

Also the tapered end of the ground engaging portion 102 could be crimped. Turning to FIGS. 5 to 8 shows the arrangement of the removeable wire engaging clip 30 to the post 100. The wire engaging clip 30 is adapted for retaining an elongate strand member such as a wire to the post 100. The wire engaging clip 30 30 has a body portion 31 with a base 36. The base is adapted to contour and abut with an outside surface of a post 100. The body portion 31 includes at least one engaging means 32, 33 for capturing, retaining and supporting a part of the elongate strand member in an opening 34, 25 therein. The body portion 31 has extending outwardly and downwardly from the base 36 an aperture engaging means 38, 39 such that aperture engaging means 38, 39 is dimensioned and configured to fit within an aperture 104 in the post 100 and to retain the wire engaging clip 30 to the post 100. Preferably, the wire engaging clip 30 has at least two engaging means 32 & 33 for engaging with elongate strand members where the engaging means 32, 33 are equally spaced apart. The base 36 has an outwardly facing portion 37 that is contoured such that when the wire engaging clip 30 is attached to a post 100 the base 36 contours and abuts evenly against the post 100.

The aperture engaging means 38, 39 has a shaft 38 attached at one end to the base 36 and has a locking member 39 attached at its other end such that the locking member 39 is spaced a distance from the base 36. The shaft has a diameter slightly less than the diameter of the aperture 104 in the post 100. The shaft 38 also has a length just slightly greater than the thickness of the hollow post 100 so as to allow the wire engaging clip 30 to be rotated and to abut and snugly attach to the post 100 when the wire engaging clip 30 is in a post aperture 104. The locking member 39 has a portion with a width w1 greater than the diameter of the posts aperture 104. The locking member 39 has another portion having a width wg that is less than the diameter of the post aperture 104. The locking member 39 when in one orientation is able to be inserted into the aperture and in another orientation where the wire engaging clip 30 rotated 90° the locking member 39 is not able to be removed from the post aperture 104, thus locking the wire engaging clip 30 to the post 100.

The portion of the locking member 39 having the width wl of least extent extends in a direction parallel to the longitudinal axis of the wire engaging clip 30 and the portion of the locking member 39 having the width wg of greatest extent extends in a direction perpendicular to the longitudinal axis of the wire engaging clip 30.

Preferably, the locking member 39 is elongate where the longitudinal axis of the locking member 39 is perpendicular to the longitudinal axis of the body 31 of the wire engaging clip 30. The elongation of the locking member is dimensioned and configured to fit within a corresponding elongated aperture 104 in the post 100 such that locking member 39 of the wire engaging clip 30 is able to be inserted into the aperture and then rotated 90° in order to lock and retain the wire engaging clip 30 to the post 100. The wire engaging clip 30 is made from any lightweight, durable material, preferably, the clip is made from plastic, typically High Density Poly Ethylene. The clip can be injection molded.

The invention provides numerous advantages over prior art designs and methods. The invention provides resistance against vertical movement of a post. No post treatment is required. Patterned holes allow for the insertion of a modular clipping system at any time. The steel post is less likely to be broken in it service life less breakage and less time and capital spent on repair/replacement. No nails or fasteners to contaminate the product if used in a harvesting situation. Throughout the description of this specification, the word "comprise" and variations of that word such as "comprising" and "comprises", are not intended to exclude other additives, components, integers or steps.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A post having an elongate tubular hollow member with an open upper end and an open lower end, wherein the elongate member includes:
   a) an upper portion and a lower ground engaging portion joined to one another so that the upper portion is adapted to predominately extend above the ground and the lower ground engaging portion is adapted to be fully inserted into the ground;
   b) the upper portion at the upper end of the elongate tubular hollow member has a rolled round end edge so as to form a softened and/or smooth top edge to the post in order to lessen and/or prevent snagging or catching of the post with netting, mesh, wires, scrimp, frost or hail protectors;
   c) the lower ground engaging portion has a protruding region immediately adjacent to where the upper portion and lower ground engaging portion join together, the diameter of the protruding region is greater than the diameter of the upper portion such that the protruding region defines a lipped section that is perpendicular to the longitudinal axis of the post, the lipped section is adapted to prevent the post from moving vertically when the ground engaging portion of the post is fully inserted into and enclosed within the ground;
   d) a plurality of spaced apart slotted apertures for supporting elongate strand members and wire retaining clips; and
   e) at least one removable wire retaining clip for retaining an elongate strand member to the post, the wire retaining clip is retained within one slotted aperture, the wire retaining clip includes:
      i) a main body portion having a base adapted to contour and abut with the post, a central portion extending upwardly from the base and at least two wire engaging portions projecting outwardly from and transverse to the vertical axis of the central portion, each wire engaging portion projects outwardly in an opposite direction relative to other wire engaging portion, each wire engaging portion has an end part that curves inwardly towards the base and the central portion so as to define a wire engaging aperture that is adapted to capturing, retaining and supporting a part of elongate strand member therein; and ii) an aperture engaging means extending outwardly and downwardly from the base of the main body portion wherein the aperture engaging means is dimensioned and configured to fit within the slotted aperture in the post and to retain the wire retaining clip to the post.

2. The post as claimed in claim 1, wherein the diameter of the upper portion is greater than the diameter of a distal end of the ground engaging portion.

3. The post as claimed in claim 1, wherein the lipped section forms an edge between the upper portion and lower ground engaging portion.

4. The post as claimed in claim 3, wherein the edge slopes from the ground engaging portion toward the upper portion.

5. The post as claimed in claim 1, wherein the diameter of the lipped section is greater than the diameter of the upper region to the extent to prevent the post from moving vertically once the post is inserted in to the ground.

6. The post as claimed in claim 1, wherein the upper and lower ground engaging portions are integrally joined.

7. The post as claimed in claim 1, wherein the upper and lower ground engaging portions consist of a plurality modular sections removably joined together such that the height of the post can be varied when a longer or shorter post is required.

8. The post as claimed in claim 7, wherein the length of the upper modular sections are between 0.5 m and 3 m length.

9. The post as claimed in claim 1, wherein the lipped section is formed by swaging the lower ground engaging portion until the diameter of the lower ground engaging portion in the area immediately adjacent the upper portion is greater than the diameter of the upper portion.

10. The post as claimed in claim 1, wherein the post is made from a suitable rigid and durable material for supporting wire and/or vine trellis.

11. The post as claimed in claim 10, wherein the post is made from galvanized steel.

12. The post as claimed in claim 10, wherein the post is made from metal, plastic, fibre glass, or any combination or composite thereof.

13. The post as claimed in claim 1, wherein the slotted apertures extend and are spaced along the length of the upper portion.

14. The post as claimed in claim 13, wherein the slotted apertures extend and are equally spaced circumferentially around the upper portion.

15. The post as claimed in claim 1, wherein the lower ground engaging portion has a least one aperture to allow a footer to be attached to the post.

16. The post as claimed in claim 15, wherein the slotted apertures in the lower portion are elongate.

17. The post as claimed in claim 1, wherein the post has a plurality of removable wire retaining clips where each wire retaining clip is retained within a respective slotted aperture.

18. The post as claimed in claim 1, wherein the wire engaging portions of the wire retaining clip are equally spaced apart from the central portion.

19. The post as claimed in claim 18, wherein the base of the wire retaining clip has an outwardly facing portion that is contoured such that when the wire retaining clip is attached to the post wherein the base contours and abuts evenly against the post.

20. The post as claimed in claim 19, wherein the aperture engaging means has a shaft attached at one end to the base and has a locking member attached at the other end of the aperture engaging means such that the locking member is spaced a distance from the base.

21. The post as claimed in claim 20, wherein the shaft has a diameter slightly less than the diameter of the aperture in the post.

22. The post as claimed in claim 21, wherein the shaft has a length just slightly greater than the wall thickness of the post so as to allow the wire retaining clip to be rotated and to abut and attach to the post when the wire retaining clip is in a slotted aperture.

23. The post as claimed in claim 22, wherein the length of the main body portion in the horizontal extent is greater than the length of the main body portion in the vertical extent.

24. The post as claimed in claim 23, wherein the locking member has a portion with a width greater than an aperture diameter of greatest extent of the slotted aperture, the locking member has another portion having a width that is less than the slotted aperture's diameter of greatest extent such that when in one orientation the locking member is able to be inserted into the slotted aperture and in another orientation where the wire retaining clip is rotated 90° the locking member is not able to be removed from the slotted aperture, thus locking the wire retaining clip to the post.

25. The post as claimed in claim 23, wherein a portion of the locking member having the width of least extent extends in a direction parallel to the longitudinal axis of the main body portion of the wire retaining clip.

26. The post as claimed in claim 25, wherein the portion of the locking member having the width of greatest extent extends in a direction perpendicular to the longitudinal axis of the main body portion of the wire retaining clip.

27. The post as claimed in any one of claim 25, wherein the locking member is elongate where the longitudinal axis of the locking member is perpendicular to the longitudinal axis of the main body portion of the wire retaining clip.

28. The post as claimed in claim 27, wherein the wire retaining clip is made from plastic or nylon.

29. The post as claimed in claim 28, wherein the plastic is a polyamide resin with a carbon black stabilizer.

30. The post as claimed in claim 1, wherein, the wire retaining clip is injection molded.

* * * * *